No. 790,266. Patented May 16, 1905.

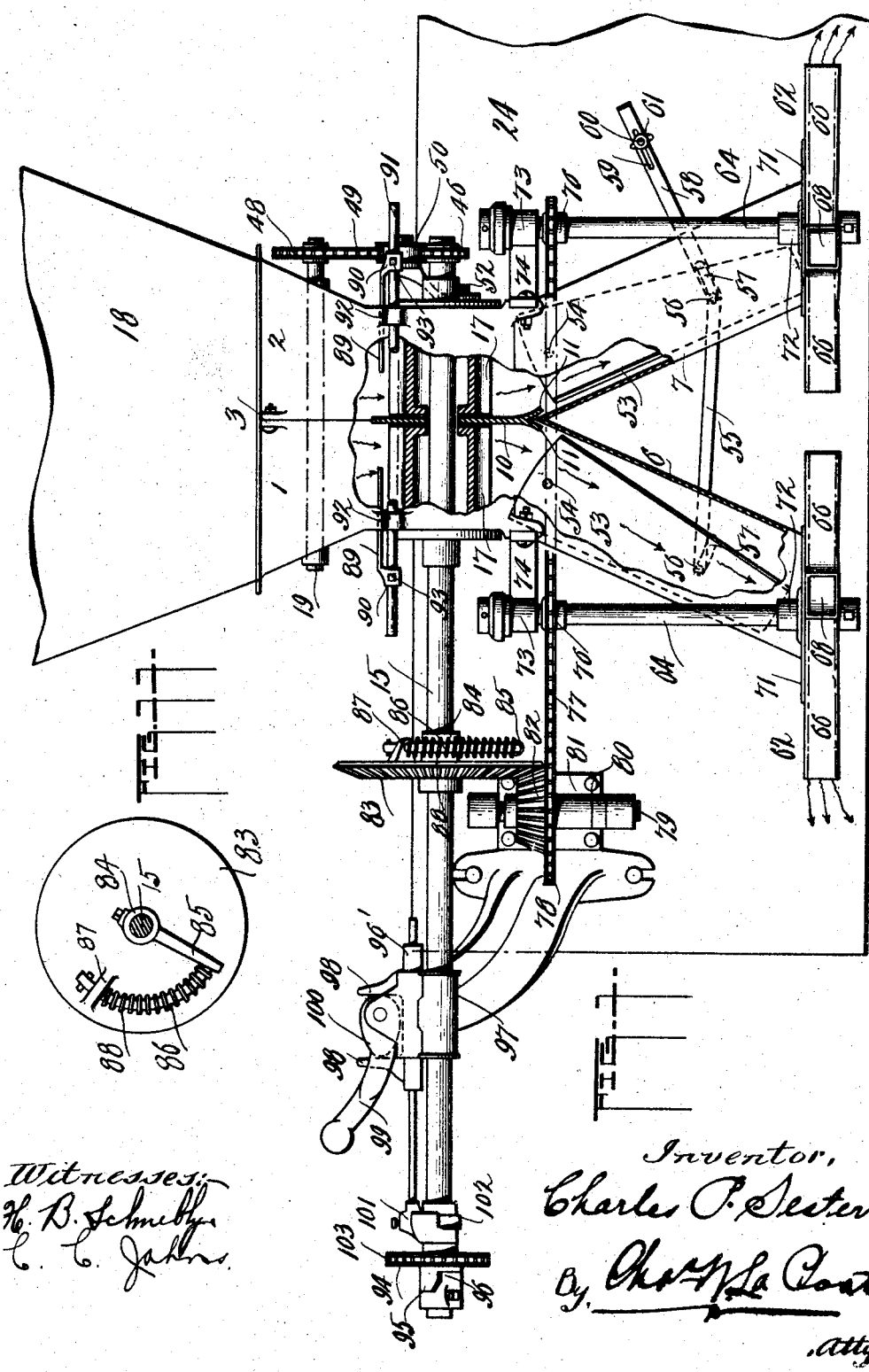

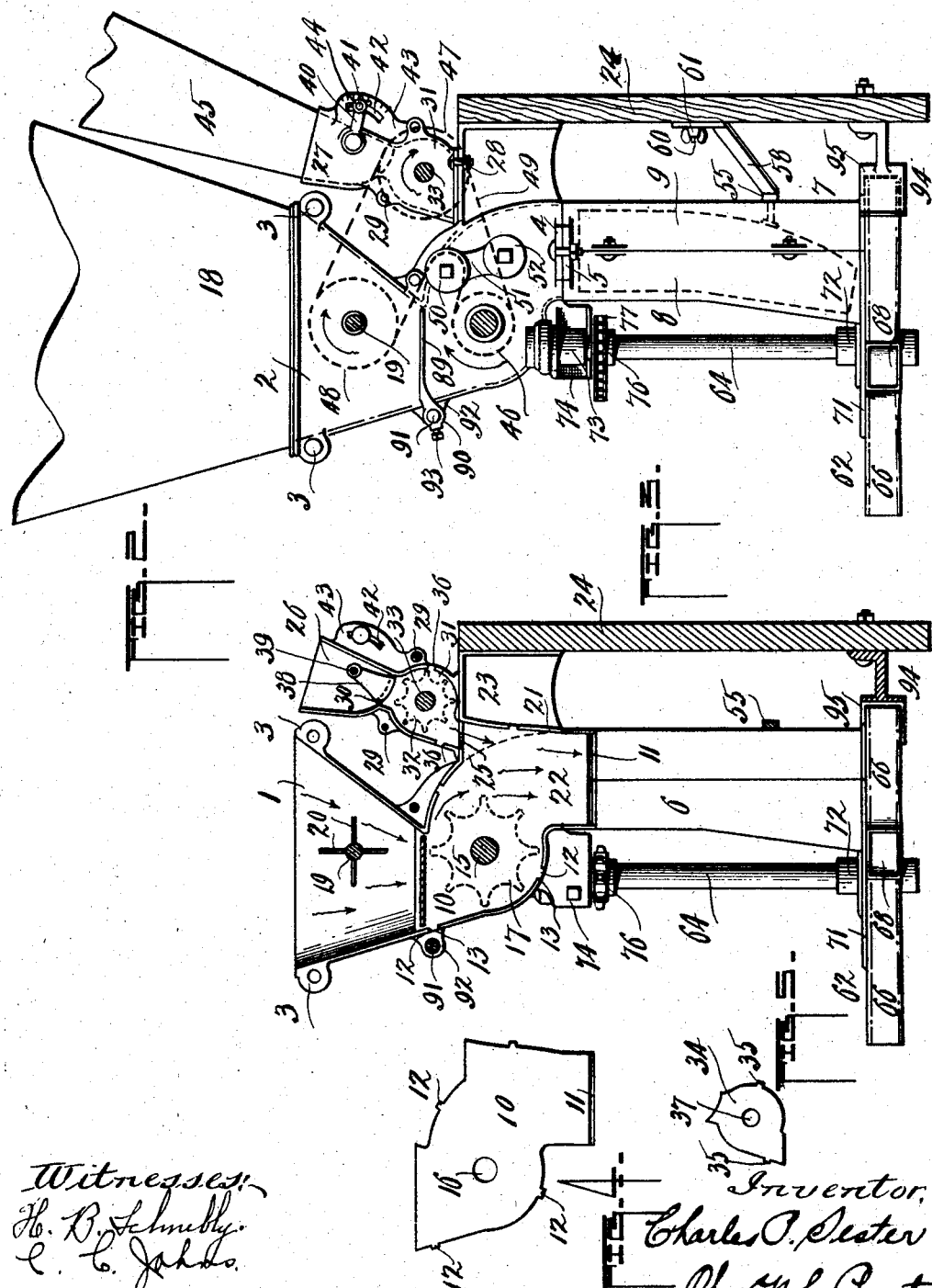

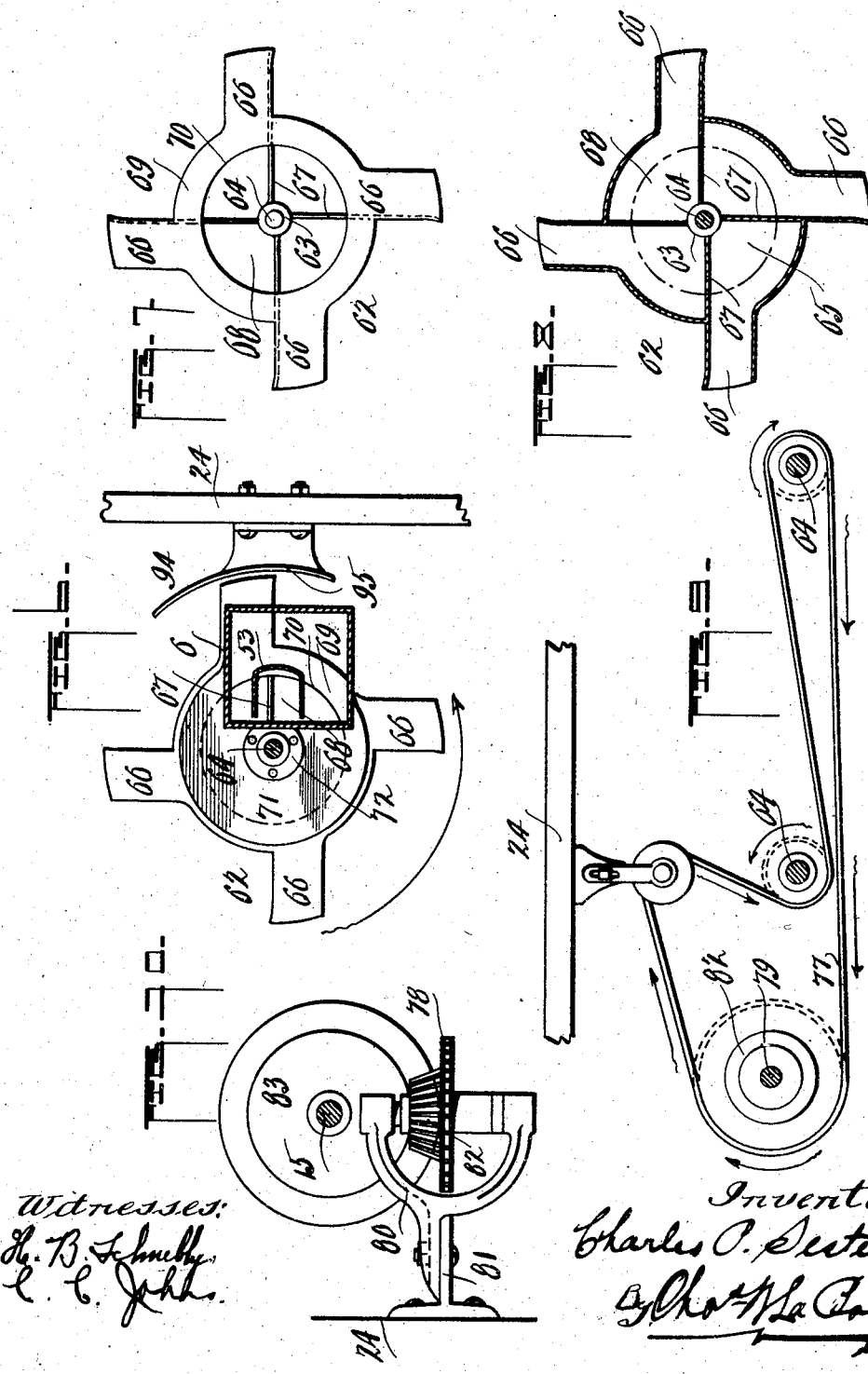

UNITED STATES PATENT OFFICE.

CHARLES P. SESTER, OF PEORIA, ILLINOIS.

SEEDING-MACHINE.

SPECIFICATION forming part of Letters Patent No. 790,266, dated May 16, 1905.

Application filed December 15, 1902. Serial No. 135,338.

*To all whom it may concern:*

Be it known that I, CHARLES P. SESTER, a citizen of the United States, residing at Peoria, in the county of Peoria and State of Illinois, have invented certain new and useful Improvements in Seeding-Machines; and I do hereby declare that the following is a full, clear, and exact description of the invention, which will enable others skilled in the art to which it appertains to make and use the same.

This invention has reference to seeding-machines, and has for its object twin seeding devices supported by an end-gate and suitably driven.

A further object of the invention is to provide a seeder of the end-gate variety having a partitioned base which supports the hopper and connected therewith converging spouts or boots, beneath which are supported distributing-fans, and within the partitioned base is carried two force-feed seed rollers or cylinders mounted upon a common shaft adapted to direct grain or seed into the converging spouts beneath.

A further object is the provision of pivoted linings or valves carried within the spouts or boots arranged to receive the grain or seed from the force-feed rollers and direct it to the fans upon the right or left of the centers thereof. These linings are adapted to be oscillated, and connecting means is provided whereby they may be oscillated simultaneously.

A further object of the invention is a new and improved fan or fans supported upon vertically-mounted shafts and disposed to rotate beneath the lower ends of the spouts. The arms of the fans form inclosures open at their outer extremities and are provided with a centrally-disposed opening to receive the grain or seed fed through the spouts and discharged from the open ends of the arms of the fan, the inclosures of the fan being provided to prevent grain from being discharged from the fan until it reaches the outer free ends of the arms, occasioned by the centrifugal movement of the fans.

A still further object in this connection is the provision of a drive between a power-shaft and the fan-shafts whereby the fans are caused to rotate in a direction opposite to that ordinarily employed in seeders of this class, causing the grain as it is discharged from the fans to be thrown therefrom on the outward sweep of the fans instead of discharging the grain at a central point between the fans. This is accomplished by rotating the fans in a direction where the inner sweep of the fans will be toward the end-gate supporting the seeding devices and discharging the grain therefrom on the extreme or opposite outer sweeps thereof.

The invention has for its further object a grass-seed attachment having a partitioned base wherein is employed two force-feed rollers or cylinders and two valves controlling the inlet thereto, and the seed attachment has communication with the base supporting the fluted force-feed rollers which receive the grain, and the grass-seed and grain are received in divided quantities into the converging spouts or boots for directing it to the fan beneath.

The invention contains various other and novel features and in the combination of parts hereinafter more particularly referred to and illustrated in the drawings, which form a part of this specification.

In the drawings, Figure 1 is an elevation from the rear of a seeder supported by an end-gate which embodies my improvements, and a portion of the base and spouts is broken away for the purpose of disclosing certain parts carried within the interior of the seeder. Fig. 2 is an elevation from one side of the seeder and with parts shown in dotted lines. Fig. 3 is a side elevation and vertical section through the center of the main portion of the hopper and grass-seed attachment to show the relative arrangement of the partitions and the manner of mixing grass-seed and grain as it is discharged by the force-feed rollers. Fig. 4 is a detached side elevation of the partition carried within the grain portion of the hopper. Fig. 5 is a detached elevation of the grass-seed partition carried within the grass-seed attachment. Fig. 6 is a plan view in cross-section of the extreme lower end of one of the spouts and the distributing-fan beneath the same and other component parts. Fig. 7 is a detached plan view of the fan. Fig. 8 is a detached plan view of the fan in horizontal cross-section. Fig. 9 illustrates a plan view of the drive which actuates the fans, and Fig. 10 is an elevation in cross-section of the drive on the power-shaft and its connection with mechanism for actuating the fans. Fig. 11 is a face view of drive-wheel on drive-shaft.

Like numerals of reference indicate corresponding parts of the figures.

In the drawings the hopper proper comprises the castings 1 and 2, each of which are made of duplicate parts for simplicity in construction and to make it convenient and easy to assemble to machine. They each have lips 3 for bolting the parts at the upper inner edges of the castings, and the lower portions are provided with flanges 4, adapted to match flanges 5 of the upper portions of spouts 6 and 7, formed of sections 8 and 9, suitably joined together and to each other. The said spouts 6 and 7 are supported at an incline and converge from a point separated a suitable distance from each other at their lower extremities to a point where the inner matched sections of the spouts at the upper ends unite at a common point with the lower portions of the castings 1 and 2.

10 indicates a centrally-disposed partition for dividing the castings 1 and 2 into distinct compartments, and the lower edge of the partition 10 is provided with flared portions 11, overlapping the inner matching edges of the spouts 6 and 7 for a purpose to be described. The manner of retaining this partition in position is to provide thereon lips 12 and provide seat portions 13 in the matching walls of the castings 1 and 2, adapted to receive the lips 12 of the partition 10 when the same is placed in position, as seen in Fig. 3, and the castings are then joined together.

The walls of the castings 1 and 2 are provided with bearings 4, through which extends a power or drive shaft 15, and the partition 10 has an aperture 16, through which the shaft also extends, and on this shaft and within the chambers formed by the outer walls of the castings 1 and 2 and the partition 10 is carried fluted force-feed rollers 17, adapted to rotate with said shaft. The partition 10 extends up a suitable distance above the upper edges or faces of the fluted force-feed rollers 17 to insure a proper division of the grain or seed admitted to the castings 1 and 2, which forms the base of the seeder and supports a hopper 18.

19 is a short shaft journaled in the upper portion of the castings 1 and 2 and arranged in the same longitudinal plane with the drive-shaft and carries agitators 20, the functions of which is apparent. The manner of rotating this shaft 19 will be further described.

Referring to the lower portions of the castings 1 and 2, they have the offset rearwardly-carried portions 21, which form chambers 22, communicating with the force-feed rollers, and it is designed to rotate the force-feed rollers so that they will have an overhead discharge into the chambers 22 and from thence into the spouts 6 and 7, which at their upper ends communicate with these chambers 22 and are inclined away therefrom. The castings 1 and 2 are further provided with brackets 23, upon which and the portions 21 it is designed to support and operate a grass-seed attachment, and the brackets 23 are in a suitable manner fixedly secured to an end-gate 24, adapted to support the hopper and its various operative devices. The upper portion of the casting 21 is provided with the apertures 25, which communicate with the chambers 22 and with chambers of a grass-seed attachment, described as follows: 26 and 27 indicate suitable castings adapted to be supported by portions 21 and 23 of the hopper-sections proper and secured thereto, as at 28, and to each other, as at 29. They together form a hopper having a contracted mouth 30 and the tubular portion 31, in which is journaled two force-feed rollers 32, carried upon a short shaft 33, having bearings in the opposite walls of the sections 26 and 27. The manner of operating this force-feed roller will be further described.

It is designed, and in fact is necessary, to partition the grass-seed attachment into two separate chambers for the carrying of the two force-feed rollers 32 to cause an equal distribution of the grass-seed to be fed to the chambers through the openings 25 to be mixed with grain in the chambers 22 and directed to the inclined-disposed grain-spouts 6 and 7.

34, Fig. 5, indicates a partition having lips 35, adapted to be carried in seat portions 36 and the same held in proper position in manner described for holding the partition 10 and is of suitable contour to match the inner walls of the grass-seed attachment and extends slightly above the upper face of the fluted rollers 32, the same provided with an aperture 37, through which the shaft 33 is carried.

In the upper portion of the grass-seed attachment is provided swinging valves 38, having pivotal connection at 39 for oscillation and controls the inlet through the contracted mouths 30 to the feed-rollers 32, and the same are swung through arms 40, connected with the valves, and each arm is provided with a pin 41, sliding in slots 42, arranged in plates 43, forming a part of the sections 26 and 27, and the adjustment of the said arms 40 is regulated by thumb-nuts 44, engaging threaded portions of the pin 41. With these valves operated in the manner described grass-seed may be fed in graduated quantities to the fluted rollers 32.

Supported by the sections 26 and 27 is a suitable hopper 45 for the purpose apparent.

On the drive-shaft 15 is carried a sprocket 46 and upon the shaft 33 of the grass-seed attachment is carried a sprocket 47, and 48 is a sprocket carried by the agitator-shaft 19, and connecting these sprocket-wheels for the purpose of simultaneously actuating the afore-mentioned shafts is a sprocket-chain 49, designed to rotate the said shafts in the direction indicated by the arrows on the drawings, and 50 is an idler or guide around which the chain is directed during its movement between the shafts 15 and 19, and the said guide 50 is carried by a bracket 51, which in a suitable manner is secured at 52 to one of the castings forming a part of the hopper.

Referring to the partition 10 and the flared lower portions 11, the same are provided for the purpose of directing any grain and seed as it is discharged from the fluted force-feed rollers into the spouts 6 and 7.

I will now describe the spouts and their relation to the upper portion of the hopper, the oscillating linings or valves therein, means for simultaneously shifting the said linings, and the fans which receive the grain and grass-seed which are supported and rotated beneath the lower ends of the spouts. Within the spouts is carried the linings or wind-shifts 53, formed of sides and back portions and pivoted at 54 at their upper ends within the spouts, leaving their lower ends free, which adapts the same for oscillation within the spouts. The walls of the lining converge toward the bottom, which provision is made when shifting the linings to direct grain and seed passing through or over the same to the right or to the left of the center of the fans which receive the grain or seed. The means for shifting the linings consists in the provision or a reach or rod 55, having pivotal connection at 56, with a short stud extending from the rear of the linings and passing through slots 57 in the rear walls of the spouts, and 58 refers to a rod or bar adapted to have a pivotal connection with one end of the rod 55 at its pivotal point 56 with the short stud of the lining, and the bar 58 is provided with an elongated slot 59, through which extends a threaded pin 60, attached in a suitable manner to the end gate 24, and 61 is a thumb-nut engaging the threaded pin 60 and is for the purpose of securing the bar 58 in adjusted position after the linings have been shifted. In the position in which the linings are shown in Fig. 1 they will direct grain or seed passing over the same to the distributers beneath on the left of their centers. It being desired to reverse the position of these linings or move them into positions other than shown in the figure, the thumb-nuts 61 will be released and the bar 58 will be drawn to the right, and through its connection, as shown, with the bar 55, which is connected with both of the linings, they will both be shifted simultaneously in the direction in which the bar 58 is then shifted or in an opposite position to that just described, which will place the linings in a position substantially as that shown.

The fans or seed-scatterers are indicated, as at 62, having a hub portion 63, and the same are carried on the lower ends of vertically-disposed fan-shafts 64. The fans comprise, further, a base-plate 65, having radially-disposed arms or plates 66, and 67 indicates partitions forming chambers 68, over which is arranged a covering-plate 69, which may be, as shown, integral with the base-plate 65 and the partitions or walls 67, and the same follows the general contour of the base-plate 65 and its radial portion 66, with the exception that a portion of the plate 69 is cut away, forming an enlarged circular aperture 70, which will permit grain or seed passing through the spouts to enter the chambers 68, and by the revolving of the fans the grain or seed will follow the chambers 66 and be discharged through open ends which are provided at the extremities of the radial portions of the plate.

94 indicates a shield which is attached in a suitable manner to the end gate 24, and the shield has a curved face-plate 95 and is of suitable length. The face-plate is designed to lie in close proximity to the sweep of the outer ends of the radial portions 66 of the fans and designed to prevent grain and seed being discharged from the fan until after the ends of the radial portions 66 have passed beyond the end of the shield, and thereby prevents any grain or seed from being discharged against the face of the end gate.

At the lower extremities of the spouts 6 I provide a plate or flange 71, which is slightly larger in diameter than the opening 70 in the fans and extends as a covering for the same outside of the walls of the spouts, (see Fig. 6,) and upon the plate 71 is carried a bearing 72, in which the lower end of the fan-shaft 64 is journaled.

The upper ends of the fan-shafts 64 are journaled in a boxing 73, which are supported by brackets 74, which in turn are attached to or supported by the hopper-frame in any suitable manner.

76 indicates sprocket-pinions carried by the fan-shafts 64, and the same are engaged by a chain-drive 77, driven by a sprocket-wheel 78, mounted on a short shaft 79, which is journaled in a frame-support 80. This last-mentioned frame is supported by a bracket 81, attached to the end gate. (See Fig. 10.)

82 indicates a bevel-pinion, which may or may not be integral with the sprocket 78, but is mounted for rotation on the shaft 79 and is actuated through a bevel-gear 83, suitably mounted for rotation on the power-shaft 15. The bevel 83 is loosely mounted on the power-shaft 15, but is adapted for rotation with said shaft for imparting power to the bevel 82, the sprocket 78, and the fan-shafts through the drive-chain 77, by means of the following device: 84 indicates a collar secured to the shaft 15, having the laterally-extended arm 85. At 86 is a rod struck on an arc of a circle, attached one end to the arm 85 and has its opposite end passing through a lug 87, carried by the bevel-gear 83, and a cotter-pin is passed through the rod 86 for the purpose of holding the bevel-gear, the rod 86, and the arm 85 in operative connection, and bearing around the rod 86 between the arm 85 and the lug 87 is shown a coil-spring 88. Any movement of the power-shaft for the purpose of imparting movement to the chain-drive 77 through the bevel 83 it will be noticed by reason of the bevel being loose on the power shaft that the jar incident to the rotation of the shaft 15 by any sudden starting of the same that all strain and sudden movement of the two gears will be entirely obviated by the spring 88 and the connection of the lug 87 with the arm 85, as the rod 86 will pass through the lug 87 of the gear, slowly compressing the spring 88, which will permit and cause the gear 83 to start with an easy motion and impart power to the gearing above described. This will prevent the breaking of the teeth on the bevel-gears or the chain and makes a most desirable drive for this and similar seeders. I might drive the fans by friction-gearing if I so desire and do not wish to be confined to the use of any particular gear.

Referring again to the hopper, in which is carried the force-feed rollers 17, I have provided duplicate cut-offs or slide-valves, designated as 89, passing through the outer walls of the castings 1 and 2 and are designed to partially or entirely close the inlet from the upper portion of the hopper to the force-feed rollers. They are independent of each other and may be adjusted to suit the convenience of the operator. They are each provided with a sleeve portion or collar 90, slidable on a common rod 91, which is supported by the lugs 92 on the front face of the castings 1 and 2 and may be adjusted in suitable positions and fixed in such positions by means of the bolts 93, all of which, it is believed, will be readily understood.

The devices for throwing the power-shaft 15 into rotation with the movements of a vehicle to which the hopper is attached comprises a sprocket-pinion 94, loosely carried on the power-shaft, and has a clutch-face 95 arranged to intermittingly engage a clutch part 96, fixed to the power-shaft.

96' is a member slidably arranged in a casting 97, which is suitably attached to the end gate and arranged with a bearing for supporting the outer end of the shaft 15, and the member 96' is provided with lugs 98.

99 is a weighted lever having a bearing in the casting 97 and is provided with a cam 100, movable between the lugs 98 for shifting the member 96' in opposite directions. The member 96' has connected therewith a casting 101, which engages a collar 102 of the sprocket-pinion 94, and while designed to shift the pinion to cause the clutch-faces 95 and 96 to engage and disengage when the lever 99 is moved the pinion is free to revolve with the shaft when imparting power thereto. A chain 103 connects the pinion 94 with a sprocket attached to the ground-wheel of a vehicle, (not shown,) which is the mode of applying power from the vehicle to the seeding devices through the shaft 15.

Having thus fully described my invention, what I claim, and desire to secure by Letters Patent of the United States, is—

1. In a broadcast seeding device, the combination of a hopper-support, diverging spouts depending therefrom, distributing-fans mounted for rotation beneath such spouts and upon vertically-disposed driven shafts, a drive-shaft, and driving connections between the drive and fan-shafts adapted to rotate such fans to cause them to discharge material therefrom upon their outer opposite sweeps, substantially as described.

2. In a broadcast seeding device, the combination of a hopper-support, diverging spouts communicating with and depending from such support, distributing-fans mounted for rotation beneath the spouts and upon vertically-disposed shafts, a drive-shaft and seeding devices actuated thereby, a yielding drive on such drive-shaft, and connections between the yielding drive and fan-shafts for rotating the latter, substantially as described.

3. In a broadcast seeding device, the combination of a hopper-support, diverging spouts communicating with and depending from such support, a partition within the support having oppositely-flared portions at its lower ends, distributing-fans carried upon vertically-disposed shafts and rotated beneath each of the said spouts, a drive-shaft and seeding devices within the support upon opposite sides of the partition and actuated by the drive-shaft, a yielding drive adapted for rotation with such drive-shaft, and connections between such yielding drive, and the fan-shafts for rotating the latter, substantially as described.

4. In a broadcast seeding device, the combination of a hopper-support, diverging spouts communicating with and depending from such support, a partition dividing such support diverging wind-shifts pivoted within each of said spouts and operative connections with both of such wind-shifts adapted to move the same simultaneously, two vertically-disposed fan-shafts, distributing-fans carried thereby, a drive-shaft, a yielding drive mounted for rotation with such drive-shaft, gearing interposed between the yielding drive and the fan-shaft and drive connection between such gearing and the fan-shafts, substantially as described.

5. In a broadcast seeding device, the combination with a partitioned hopper-support, a grass-seed attachment composed of two sections suitably joined together, a partition for such attachment held therein by means of lips seated in recesses in the matching walls of such attachment, said devices within the attachment and means for actuating such devices and two valves mounted above the said devices for controlling the inlet of material thereto, substantially as described.

6. In a device of the class described, the combination with a hopper-support, two diverging spouts connected therewith, wind-shifts pivoted within such spouts, the reach 55 at its opposite ends pivotally attached to said wind-shifts, and the operating-arm 58 connected at one end to the reach 55 and adjustably secured at its opposite end, substantially as and for the purposes set forth.

7. In a device of the class described, the combination with a hopper-support, two spouts attached to and diverging from such support, wind-shifts carried within such spouts and pivoted to swing therein and having short studs movable in slots in the walls of the spouts, the reach 55 at its opposite ends attached to the studs of the wind-shifts, and an operating-arm connected with the stud of one of said wind-shifts to facilitate in shifting both of said shifts simultaneously, substantially as and for the purposes set forth.

8. In a device of the character described, the combination of a hopper-support, a seed-spout depending therefrom, a wind-shift pivotally hung in said spout, of a distributing-fan mounted for rotation beneath said spout, said fan having a series of conjoined radial wings inclosed on all sides with open free ends, partitions for separating said wings near their hub portions and the upper face of said fan having inlet-openings to the wings upon opposite sides of the partitions which communicate with the lower discharge-opening of the spout, substantially as and for the purposes set forth.

9. In a broadcast seeding device, the combination of a hopper-support, diverging spouts depending from such support, distributing-fans mounted for rotation beneath such spout, a drive-shaft and drive connections between the drive-shaft and distributing-shafts adapted to rotate such fans toward each other on their outer sweep for discharging material therefrom as they sweep outwardly from their support, substantially as described.

10. In a device of the character described, the combination of a hopper-support, a seed-spout depending therefrom, a wind-shift pivotally hung in said spout, of a distributing-fan mounted for rotation beneath said spout, said fan having a series of conjoined radial wings inclosed on all sides with open free ends, partitions for separating said wings near their hub portions and the upper face of said fan having inlet-openings to the wings upon opposite sides of the partitions which communicate with the lower discharge-opening of the spout, and a shield suitably supported adjacent to the outer sweep of the wings, all substantially as and for the purposes set forth.

11. In a device of the character described, the combination with a hopper-support, a drive-shaft extending through the hopper, two spouts depending from said hopper, fan-shafts, fans on the lower ends of said fan-shafts adapted to receive material from lower ends of the spouts, a yielding drive on the drive-shaft, sprocket-pinions on the upper end of the fan-shafts and driving connections between the yielding drive on the drive-shaft and the pinions on the fan-shafts, all substantially as described and shown.

In testimony whereof I affix my signature in presence of two witnesses.

CHARLES P. SESTER.

Witnesses:
HENRY OELKERS,
CHAS. W. LA PORTE.